(12) United States Patent
Bogert et al.

(10) Patent No.: US 11,543,047 B2
(45) Date of Patent: Jan. 3, 2023

(54) SWITCH ASSEMBLY FOR VALVE ACTUATOR

(71) Applicant: Automatic Switch Company, Florham Park, NJ (US)

(72) Inventors: Roy B. Bogert, Lincoln Park, NJ (US); Emmanuel D. Arceo, Bloomfield, NJ (US); Christopher Ganci, Rockaway, NJ (US); Ivan Nicholl, Rockaway, NJ (US); Kevin Toth, Bridgewater, NJ (US)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 0 days.

(21) Appl. No.: 17/139,828

(22) Filed: Dec. 31, 2020

(65) Prior Publication Data

US 2022/0205555 A1    Jun. 30, 2022

(51) Int. Cl.
*F16K 31/04*    (2006.01)
*F16K 31/52*    (2006.01)

(52) U.S. Cl.
CPC .................................. *F16K 31/52* (2013.01)

(58) Field of Classification Search
CPC ......... F16K 31/04; F16K 31/046; F16K 31/52
See application file for complete search history.

(56) References Cited

U.S. PATENT DOCUMENTS

| | | | |
|---|---|---|---|
| 3,793,492 A | 2/1974 | Duncan et al. | |
| 3,819,888 A | 6/1974 | Duncan | |
| 4,074,112 A | 2/1978 | Runft | |
| 4,214,133 A * | 7/1980 | Wolford | H01H 36/0073 200/302.1 |
| 4,457,132 A | 7/1984 | Roberts | |
| 4,831,350 A * | 5/1989 | Rose | H01H 36/0006 335/206 |
| 4,839,475 A | 6/1989 | Wilkinson et al. | |

(Continued)

FOREIGN PATENT DOCUMENTS

| | | |
|---|---|---|
| EP | 0727601 A1 | 8/1996 |
| EP | 3373086 A1 | 9/2018 |
| GB | 1174548 A | 12/1969 |

OTHER PUBLICATIONS

Dungs Multifunctional Gas Control, GasMultiBloc Multifunctional Gas Controls—Dungs Combustion Controls, https://www.dungs.com/en/productgroups/gasmultiblocr-multifunctional-gas-controls.

(Continued)

*Primary Examiner* — Paul J Gray
(74) *Attorney, Agent, or Firm* — Mackey Law Firm PLLC (57) ABSTRACT

A switch assembly for a valve actuator can include a bracket, a rotatable switch rotatably coupled to the bracket at an adjustable angle, a fixed switch fixedly mounted to the bracket, an arm rotatably coupled to the bracket, and an adjustable switch trigger coupled to the arm. The rotatable switch can be tripped by the valve actuator and a trip point of the rotatable switch can be calibrated by setting the adjustable angle. The fixed switch can be tripped by the switch trigger on the arm and a trip point of the fixed switch can be set by adjusting the switch trigger relative to the arm. The assembly can include a calibration fixture for calibrating the switch assembly to the valve actuator independently of the valve actuator.

15 Claims, 10 Drawing Sheets

(56) References Cited

U.S. PATENT DOCUMENTS

| | | | |
|---|---|---|---|
| 4,855,545 A | | 8/1989 | Kreuter |
| 5,278,530 A | | 1/1994 | Zovath |
| 5,579,800 A | * | 12/1996 | Walker ................ F16K 37/0041 |
| | | | 137/15.01 |
| 6,044,791 A | * | 4/2000 | LaMarca ............. F16K 37/0058 |
| | | | 340/672 |
| 7,163,192 B2 | | 1/2007 | Aoki et al. |
| 7,516,941 B2 | | 4/2009 | Combs |
| 8,375,883 B2 | * | 2/2013 | Soldo ....................... H01H 9/02 |
| | | | 116/DIG. 21 |
| 8,653,387 B2 | * | 2/2014 | Bessette ............. H01H 35/2628 |
| | | | 200/83 Z |
| 2003/0222235 A1 | | 12/2003 | Filkovski et al. |
| 2004/0144942 A1 | | 7/2004 | Royse |
| 2012/0193558 A1 | | 8/2012 | Hoots et al. |
| 2015/0107676 A1 | | 4/2015 | Green et al. |
| 2020/0284374 A1 | | 9/2020 | Heaney |

OTHER PUBLICATIONS

Honeywell Fluid Actuators, https://customer.honeywell.com/en-US/Pages/Department.aspx?cat=HonECC%2520Catalog&category=Fluid%2520Actuator&cappath=. . . .

International Search Report and Written Opinion dated Apr. 12, 2022 for International Application No. PCT/US2021/065806.

* cited by examiner

SWITCH ASSEMBLY FOR VALVE ACTUATOR

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to control valves and more specifically relates to actuators and control systems for control valves.

Description of the Related Art

Flow control systems are common in process and manufacturing systems, such as applications in hazardous or harsh environments. It can be important to accurately monitor and control various parameters in such systems, including flow rates, valve positions, pressure, valve health and other aspects of fluid control components. Accordingly, control systems and valves that provide rapid and accurate control are called for in numerous industries. Further, there is often a demand for control systems and components, including valves, actuators, and their control components, with short lead times.

Manufacturing control systems and their components can be time consuming and labor intensive. For example, in order to ensure proper operation, switches used to control valves and their actuators are often made adjustable to account for various manufacturing and/or operational issues. These switches are often pre-set to operate at specific points in the opening and/or closing of a control valve. This is often accomplished by installing each switch on the valve's actuator and then adjusting each switch while operating the actuator through one or more open/close cycles.

There is a need in the art for improved assemblies to increase manufacturing efficiency and simplify supply chain management without jeopardizing proper operation, reliability, and repeatability of control system components. The disclosures and teachings of the present disclosure are directed to devices, systems and methods for improved control valve assemblies and related processes.

BRIEF SUMMARY OF THE INVENTION

In at least one embodiment, a switch assembly for a valve actuator can include a bracket for supporting a plurality of switches, one or more switches rotatably coupled to the bracket at one or more adjustable angles, and one or more switches fixedly mounted to the bracket. In at least one embodiment, the bracket can be non-conductive to electrically isolate the switches from the valve actuator. The valve actuator can trip or trigger the rotatably mounted switch(es) at a trip point (or points) that is/are independently adjustable by calibrating the adjustable angle(s). A trigger mechanism can be used to trip/trigger the fixedly mounted switch(es) at a trip point (or points) that is/are adjustable by calibrating the trigger mechanism.

For example, in at least one embodiment, the trigger mechanism can include an arm rotatably coupled to the bracket. An indicating end of the arm can couple with the actuator or a portion of the valve controlled by the actuator, such as a valve stem of the valve or a valve stem position indicator of the valve. A bracket end of the arm can be rotatably coupled to the bracket. Movement of the arm can directly or indirectly trip the fixedly mounted switch(es). One or more switch triggers can be adjustably coupled to the arm and can trip the fixedly mounted switch(es).

In at least one embodiment, the switch assembly also includes one or more terminals mounted to the bracket, wherein at least one of the rotatable switch and the fixed switch is wired to the terminal. In at least one embodiment, the switch assembly can include a plurality of fixedly mounted switches, which can have different and independently adjustable trip points. In at least one embodiment, the switch assembly further includes a calibration fixture for calibrating the switch assembly to the valve actuator independently of the valve actuator.

In at least one embodiment, a switch assembly for a valve actuator of a control valve can be set by assembling a plurality of switches to a bracket, thereby creating the switch assembly, aligning the switch assembly with a calibration fixture and adjusting the switches while the switch assembly is secured to the calibration fixture. Thereafter, the switch assembly can be mounted to the valve actuator having been calibrated for the valve actuator independently of the valve actuator. The switches can include one or more switches fixedly and/or directly mounted to the bracket, as well as one or more switches rotatably and/or pivotably mounted to the bracket. The calibration fixture can simulate select functions, operations, and/or movements of the valve actuator.

Aligning the switch assembly with the calibration fixture can include positioning, aligning, or colimiting one or more assembly datums on the switch assembly to one or more corresponding fixture datums on the calibration fixture. The assembly datum(s) and the fixture datum(s) can cooperate to ensure proper alignment between the switch assembly and the calibration fixture. With the switch assembly properly aligned with the calibration fixture, the switch assembly can then be secured to the calibration fixture.

With the switch assembly properly aligned with, and secured to, the calibration fixture, trip points of the switches can be adjusted. For example, adjusting a trip point of the at least one fixed switch can be performed by adjusting a trigger between the at least one fixed switch and an arm pivotably mounted to the bracket. Adjusting a trip point of the at least one rotatable switch can be performed by adjusting an angle at which the at least one rotatable switch is mounted to the bracket.

Once the switches have been adjusted with the switch assembly secured to the calibration fixture, the switch assembly can be removed from the calibration fixture. At this point, the switch assembly can be put into storage for future mating to a valve actuator, or can be immediately mated to a valve actuator. In either case, the switch assembly can be aligned with the valve actuator by positioning the assembly datum on the switch assembly to an actuator datum on the valve actuator, in much the same manner as was done with the calibration fixture. Then, the switch assembly can be secured to the valve actuator. Once the switch assembly is aligned with, and secured to, the valve actuator, each of the switches can be expected to be properly calibrated to the valve actuator by virtue of the adjustments made while the switch assembly was aligned with, and secured to, the calibration fixture.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment(s). Such implementation-specific decisions can include, and likely are not limited to, compliance with system-related, business-related, government-related and other constraints, which can vary by specific implementation, location and from time to time. While a developer's efforts might be complex and time-consuming in an absolute sense, such efforts would be, nevertheless, a routine undertaking for those of skill in the art having the benefits of this disclosure. It must be understood that the embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawings are examples presented for purposes of illustration and explanation and are not the only embodiments of the subject(s) hereof.

Applicants have created systems and methods for improved assemblies to increase manufacturing efficiency and simplify supply chain management without jeopardizing proper operation, reliability, and repeatability of control valves, associated system components, and related processes. Applicants have created systems and methods for improved assemblies to increase manufacturing efficiency and simplify supply chain management without jeopardizing proper operation, reliability, and repeatability of actuators for control valves. Applicants have created systems and methods for improved assemblies to increase manufacturing efficiency and simplify supply chain management without jeopardizing proper operation, reliability, and repeatability subassemblies for control valve actuators. Applicants have created systems and methods for assembling and calibrating subassemblies for control valve actuators. In at least one embodiment, switch subassemblies can be assembled and adjusted, or otherwise calibrated, for use with actuators for control valves.

Figure 1:
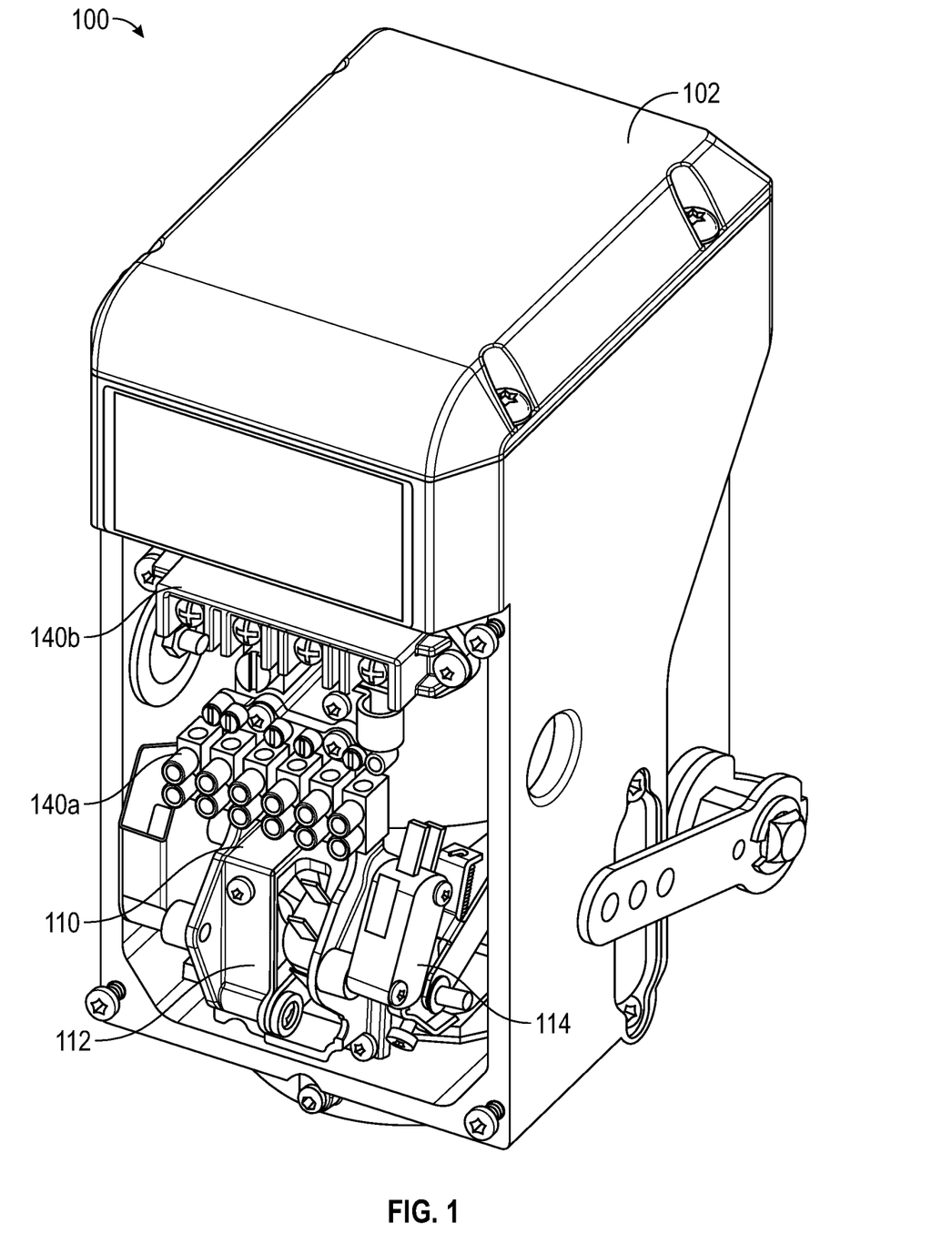
FIG. 1 is a perspective view of one of many embodiments of a valve actuator assembly according to the disclosure.
Figure 2:
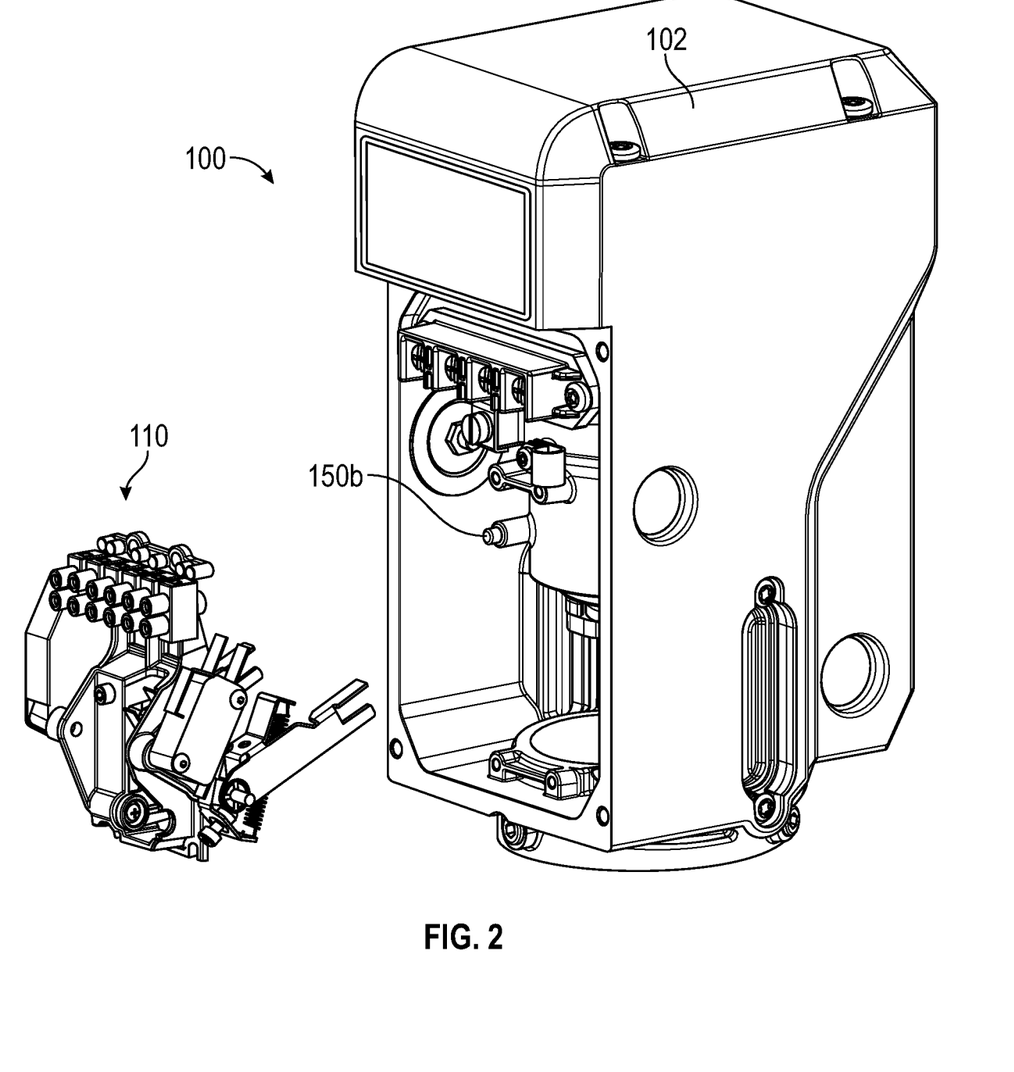
FIG. 2 is a partially exploded perspective view of the valve actuator assembly of FIG. 1, showing a switch assembly separated from a valve actuator.
Figure 3:
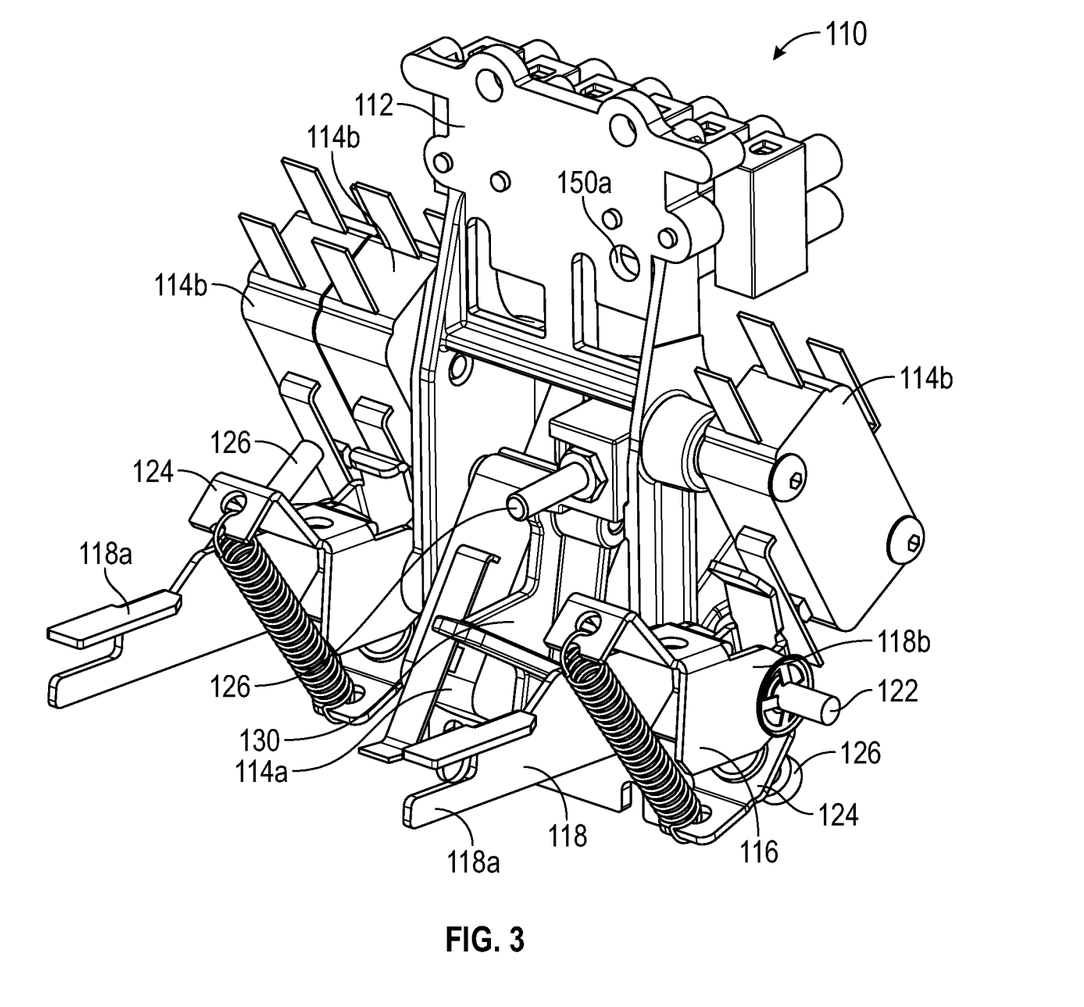
FIG. 3 is a reverse perspective view of the switch assembly of FIG. 2.
Figure 4:
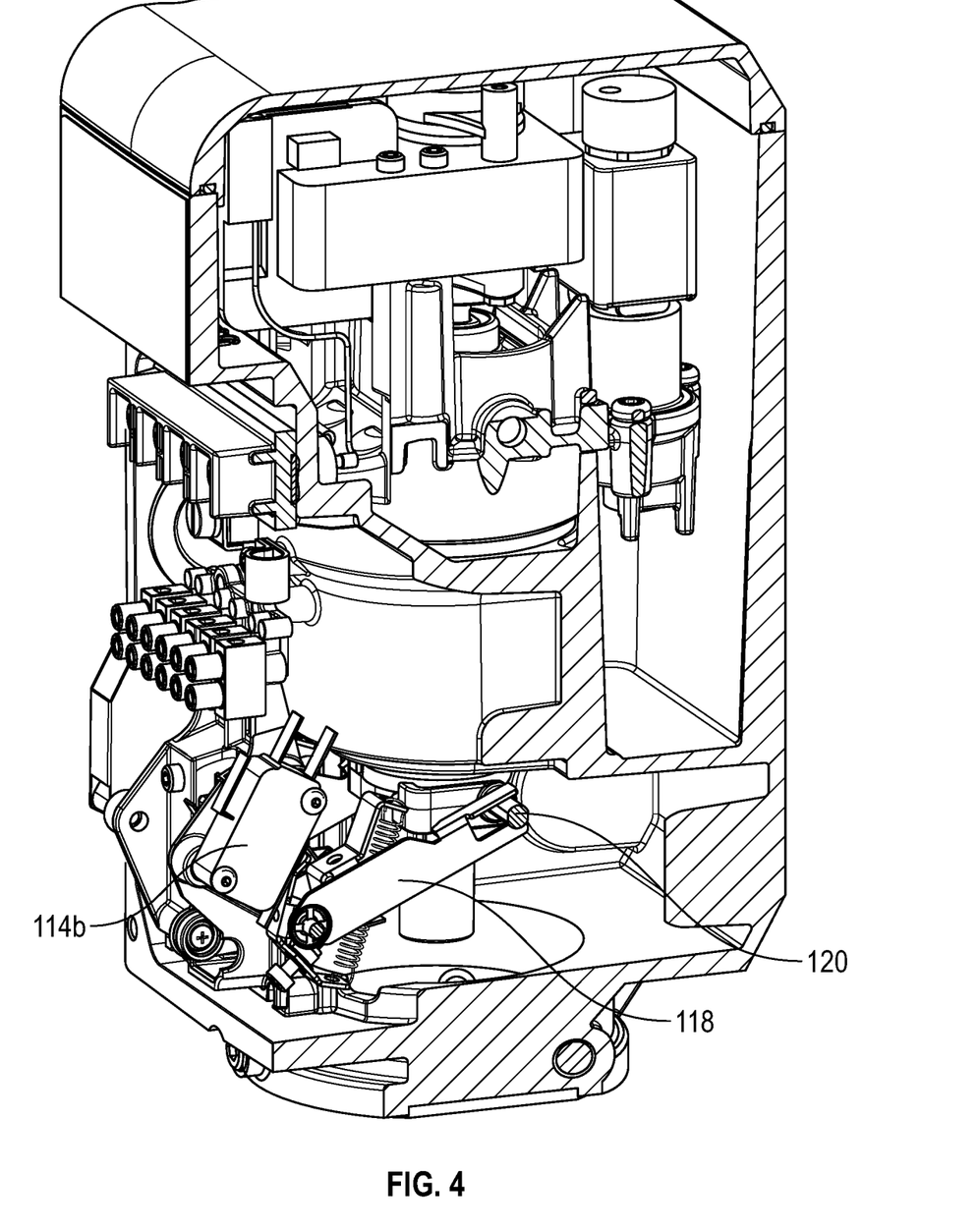
FIG. 4 is a partial perspective view of the valve actuator assembly of FIG. 1.
Figure 5:
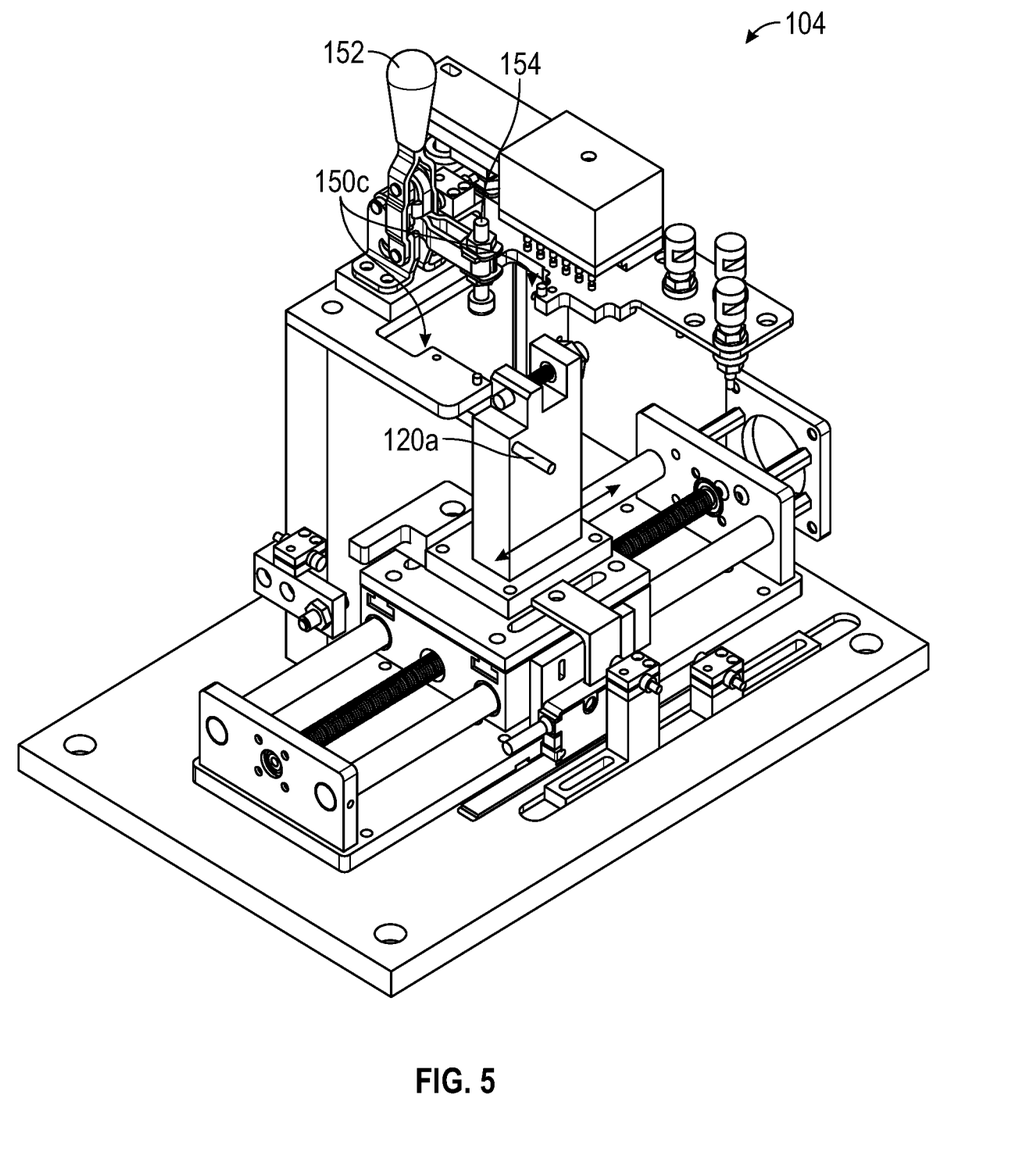
FIG. 5 is a perspective view of one of many embodiments of a calibration fixture according to the disclosure.
Figure 6:
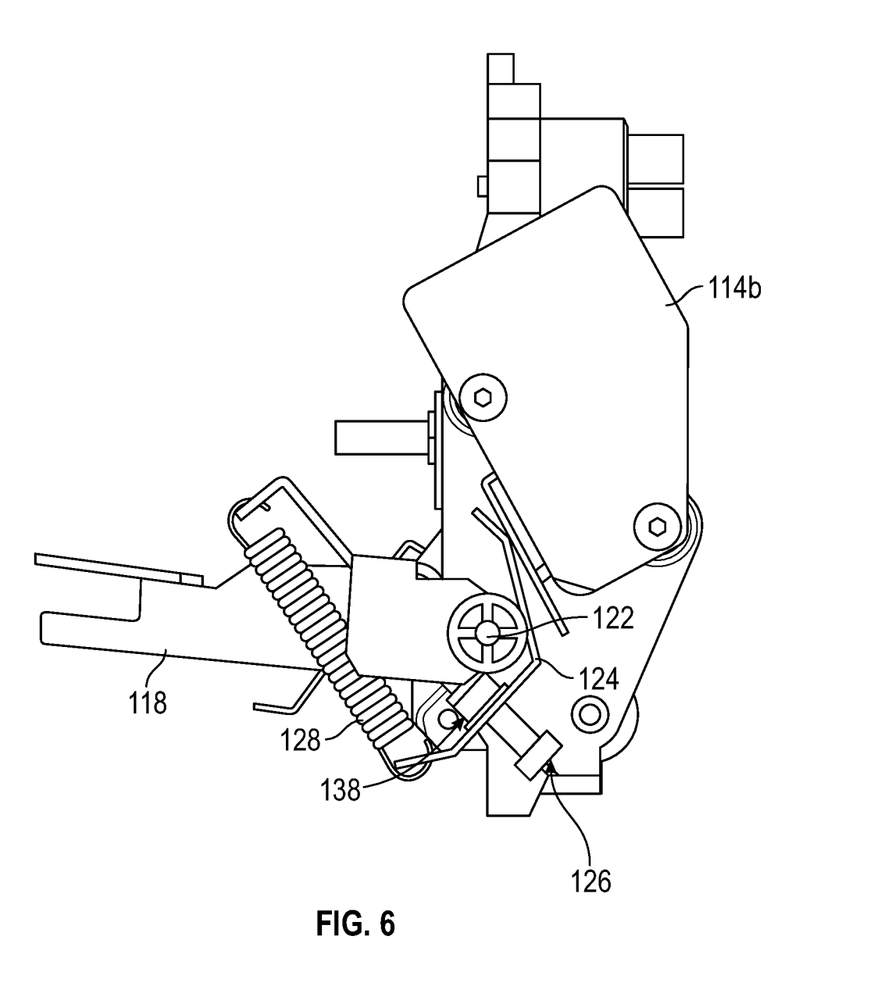
FIG. 6 is a reverse side view of the switch assembly of FIG. 2.
Figure 7:
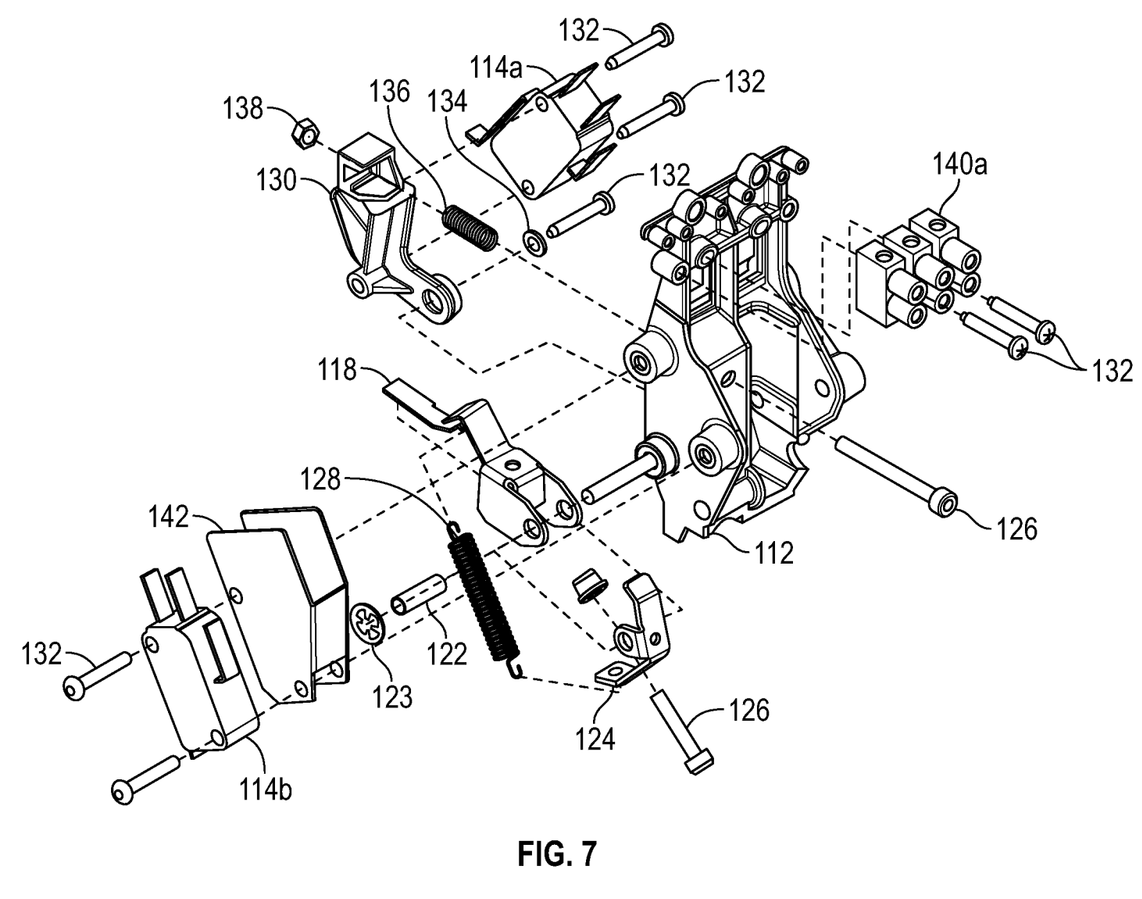
FIG. 7 is an exploded perspective view of one of many embodiments of a switch assembly according to the disclosure, showing one rotatably mounted switch and one fixedly mounted switch.
Figures 8, 9:
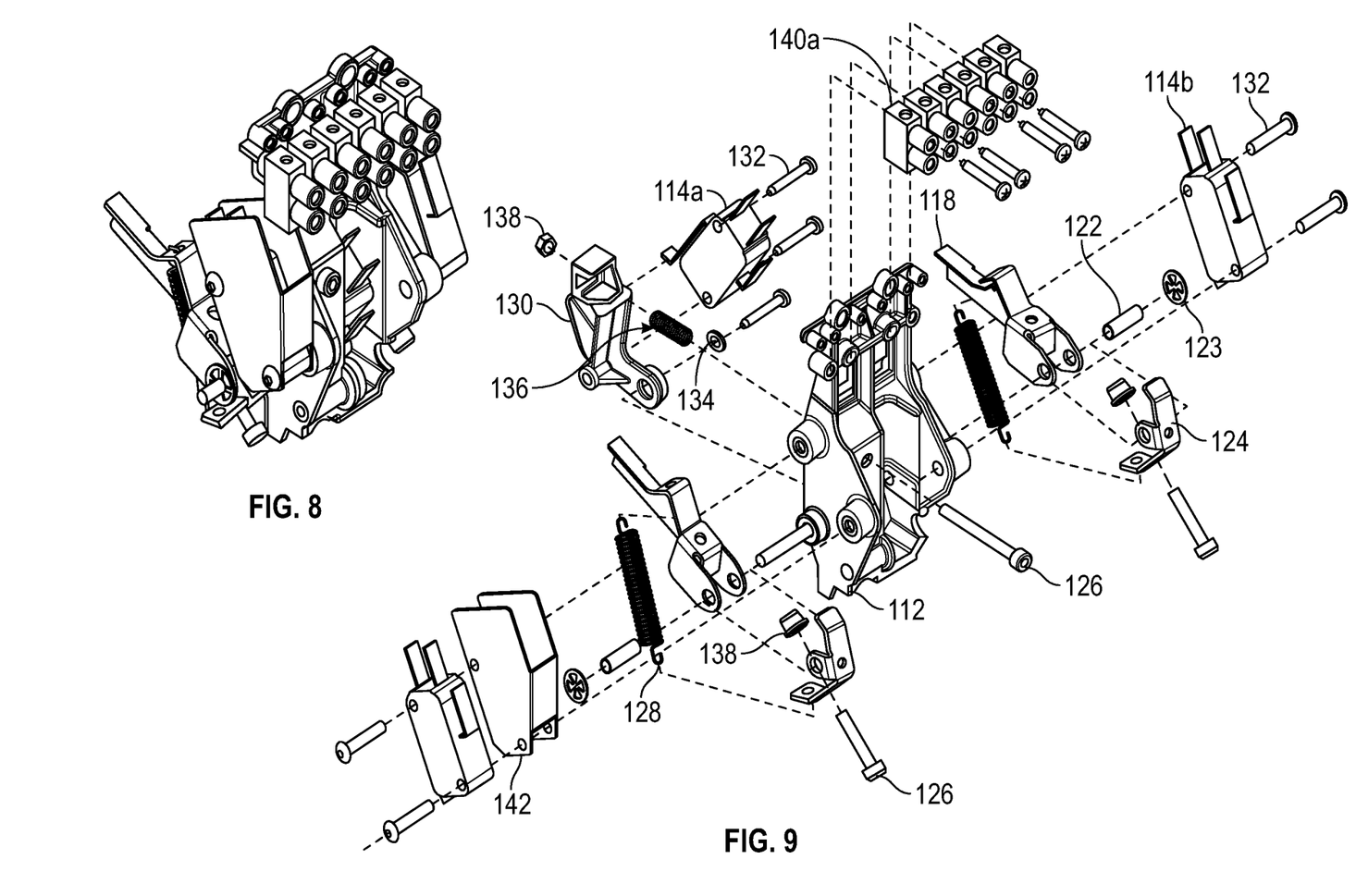
FIG. 8 is a perspective view of one of many embodiments of a switch assembly according to the disclosure, showing one rotatably mounted switch and two fixedly mounted switches.
FIG. 9 is an exploded perspective view of the switch assembly of FIG. 8.
Figures 10, 11:
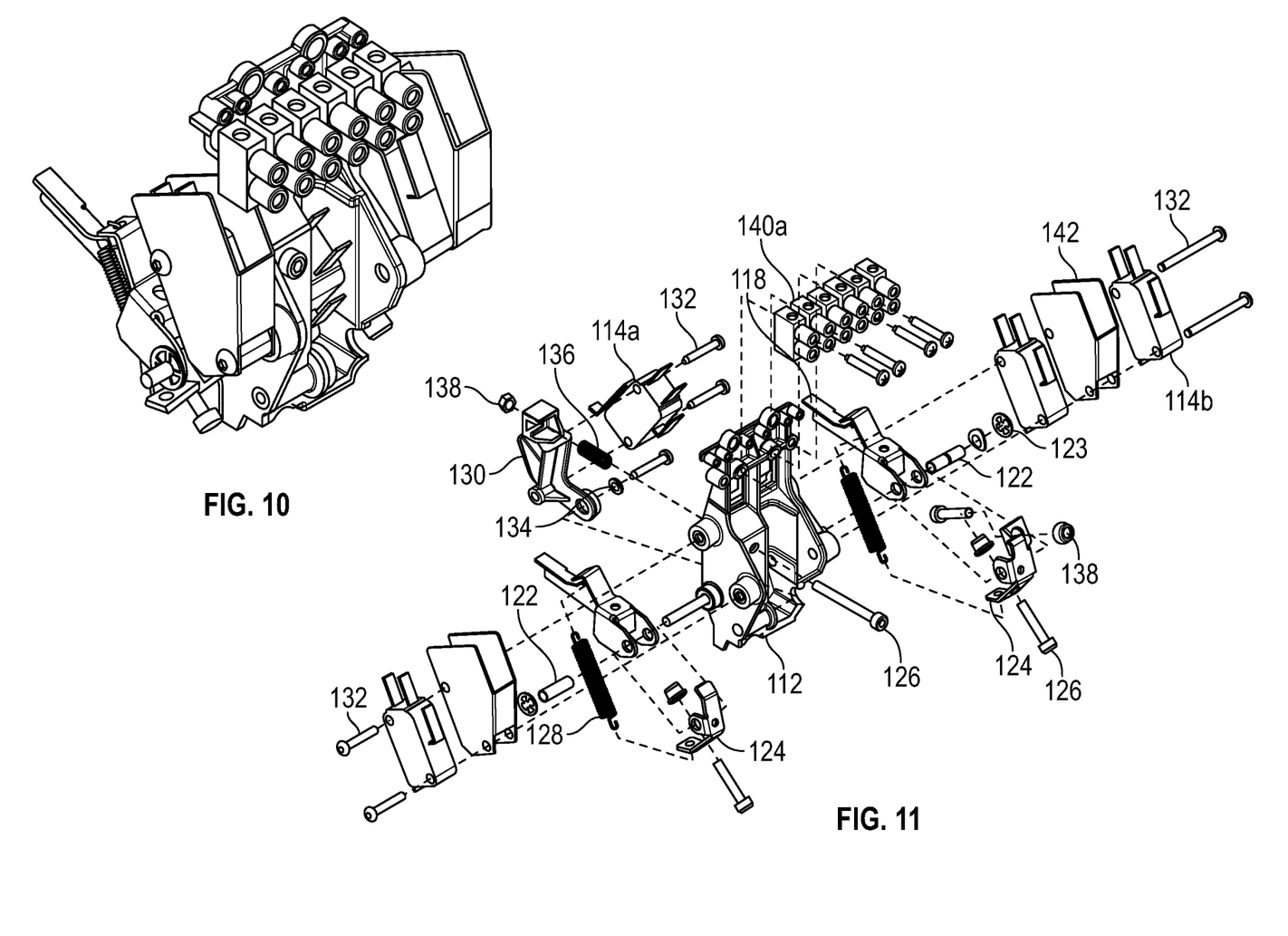
FIG. 10 is a perspective view of one of many embodiments of a switch assembly according to the disclosure, showing one rotatably mounted switch and three fixedly mounted switches.
FIG. 11 is an exploded perspective view of the switch assembly of FIG. 10.
Figure 12:
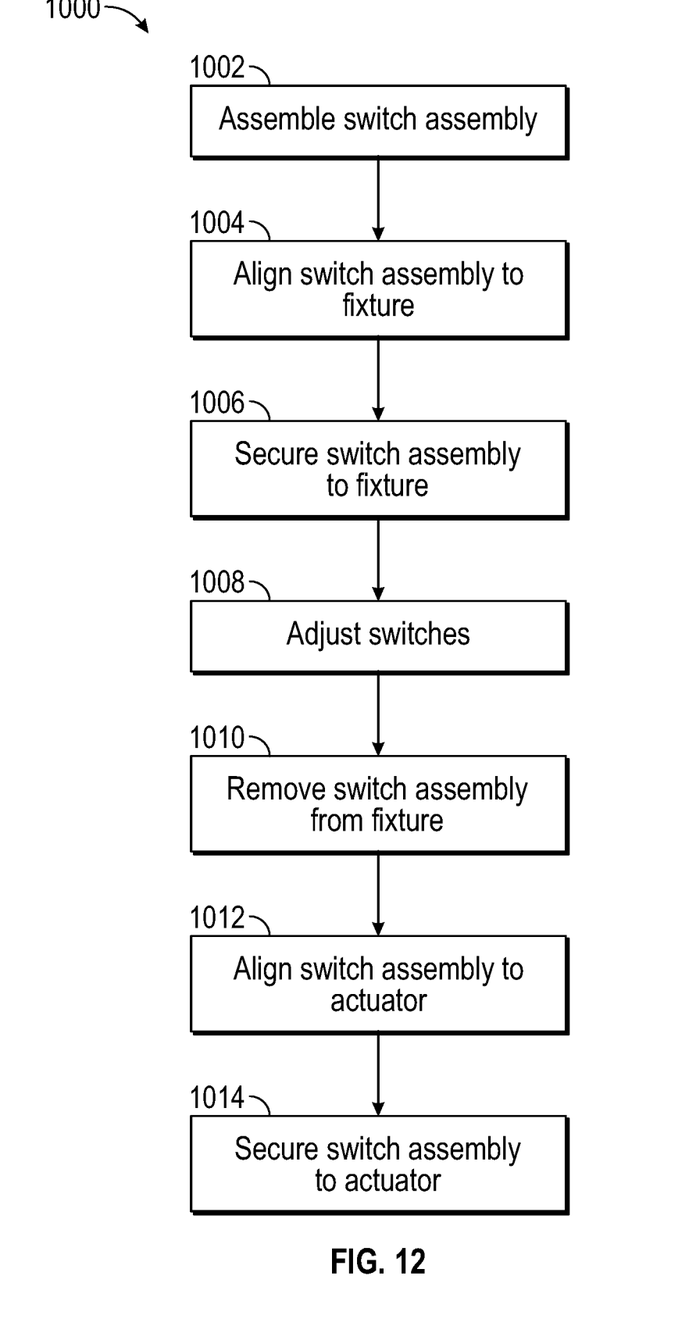
FIG. 12 is a flow chart showing one of many embodiments of an assembly method according to the disclosure.

FIG. 1 is a perspective view of one of many embodiments of a valve actuator assembly according to the disclosure. FIG. 2 is a partially exploded perspective view of the valve actuator assembly of FIG. 1, showing a switch assembly separated from a valve actuator. FIG. 3 is a reverse perspective view of the switch assembly of FIG. 2. FIG. 4 is a partial perspective view of the valve actuator assembly of FIG. 1. FIG. 5 is a side view of the switch assembly of FIG. 2 mounted to a calibration fixture. FIG. 6 is a reverse side view of the switch assembly of FIG. 2. FIG. 7 is an exploded perspective view of one of many embodiments of a switch assembly according to the disclosure, showing one rotatably mounted switch and one fixedly mounted switches. FIG. 8 is a perspective view of one of many embodiments of a switch assembly according to the disclosure, showing one rotatably mounted switch and two fixedly mounted switches. FIG. 9 is an exploded perspective view of the switch assembly of FIG. 8. FIG. 10 is a perspective view of one of many embodiments of a switch assembly according to the disclosure, showing one rotatably mounted switch and three fixedly mounted switches. FIG. 11 is an exploded perspective view of the switch assembly of FIG. 10. FIG. 12 is a flow chart showing one of many embodiments of an assembly method according to the disclosure. FIGS. 1-12 will be described in conjunction with one another.

In at least one embodiment, an actuator assembly 100 for the control and/or monitoring of a control valve can include a valve actuator 102 and a switch assembly, or subassembly, 110. In at least one embodiment, a switch assembly 110 for a valve actuator 102 can include a bracket 112 for supporting a plurality of switches 114. One or more switches 114a can be rotatably coupled to the bracket 112 at one or more adjustable angles. One or more switches 114b can be fixedly mounted to the bracket 112. In at least one embodiment, the bracket 112, and/or portions thereof, can be non-conductive to electrically isolate the switches 114 from the valve actuator 102, and or other components of the subassembly 110. The valve actuator 102 can trip or trigger the rotatably mounted switch(es) 114a at a trip point (or points) that is/are independently adjustable by calibrating the adjustable angle(s). A trigger mechanism 116 can be used to trip/trigger the fixedly mounted switch(es) 114b at a trip point (or points) that is/are adjustable by calibrating the trigger mechanism 116.

In at least one embodiment, the plurality of switches 114 includes a high fire switch to indicate a fully open position of a valve controlled by the actuator 102, a low fire switch to indicate a mid-stroke position of the valve, a proof of closure switch to indicate a fully closed position of the valve, and a limit switch to control a stroke limit of the valve actuator 102. In at least one embodiment, the limit switch can be a rotatably mounted switch 114a and can be actuated by the valve or the valve actuator 102. In at least one embodiment, the high fire switch, the low fire switch, and the proof of closure switch can be fixedly mounted switches 114b and can be actuated by one or more arms 118 of the trigger mechanism 116 mounted to the bracket 112. The arms 118 can be rotatable to follow an indicator 120 that moves with a valve stem of the valve as the valve actuator 102 opens and closes the valve and/or a simulator 120a that simulates the indicator 120.

In at least one embodiment, the trigger mechanism 116 can include an arm 118 rotatably coupled to the bracket 112. An indicating end 118a of the arm 118 can couple with the actuator 102 or a portion of the valve controlled by the actuator 102, such as a valve stem of the valve, a valve stem position indicator 120 of the valve, or a simulator 120a that simulates the indicator 120. A bracket end 118b of the arm 118 can be rotatably coupled to the bracket 112, such as through an axel 122 and keeper 123. Movement of the arm 118 can directly or indirectly trip the fixedly mounted switch(es) 114b. In at least one embodiment, one or more switch triggers 124 can be adjustably coupled to the arm 118, such through the use of an adjustable set screw 126 and/or a tension spring 128, and this trigger 124 can trip the fixedly mounted switch(es) 114b. Alternatively, or additionally, a set screw 126 can be located between a trigger 124 and a fixedly mounted switch 114b, as best shown in FIG. 11. In this manner, one arm 118 and trigger 124 pair can trip two or more fixedly mounted switch(es) 114b, such as the high fire switch and the low fire switch, at different points along the travel of the valve stem. As can be understood, there can be some dependence between adjustments to the trip points where mechanism trips two or more switches 114. However, where independent mechanisms trip different switches 114, adjustments to the trip points can be independent.

In at least one embodiment, the rotatably mounted switch(es) 114a can be directly rotatably mounted to the bracket 112, or can be rotatably mounted to the bracket 112 through a carrier 130, which is in turn is rotatably mounted to the bracket 112. In at least one embodiment, the rotatably mounted switch(es) 114a can be fixedly, or rigidly, mounted to the carrier 130 using fasteners 132, such as machine screws. In at least one embodiment, the carrier 130 can be rotatably mounted to the bracket 112 using a fastener and a washer 134. The trip point of the rotatably mounted switch(es) 114a can be configured by adjusting a set screw 126, which can set the adjustable angle between the rotatably mounted switch(es) 114a and the bracket 112. In at least one embodiment, the angle between bracket 112 and the carrier 130, and thus the rotatably mounted switch 114a, can be set and adjusted using a set screw 126, a spring 136, and one or more nuts 138. The nuts 138 can be held captive by the carrier 130 or other portions of the subassembly 110 and/or can include locking nuts to prevent the set screws from moving, thereby fixing the trip point of any associated switches 114.

The switches 114 can be wired to a switch terminal 140a, which can in turn be wired to an actuator terminal 140b, when the switch assembly 110 is mounted to the actuator 102. The switch terminal 140a can be secured to the bracket 112 using additional fasteners 132. The switch terminal 140a can also be wired to terminal on a calibration fixture 104, for use during adjustment, or calibration, of the switches 114.

In at least one embodiment, the bracket 112 itself is made from a non-conductive material, thereby insulating the switches 114 from each other and/or the actuator 102. In at least one embodiment, an insulator 142 can be used to cover a portion of one or more of the switch(es) 114, and thereby insulating the switches 114 from each other, the bracket 112, and/or the actuator 102.

In at least one embodiment, a calibration fixture 104 can be used to adjust, or calibrate, the switches 114 before they are mounted to the actuator 102 on which they will be used. In at least one embodiment, the calibration fixture 104 can include a simulator 120a, or other structure, that simulates the indicator 120. In at least one embodiment, the calibration fixture 104 can include a simulator or structure that simulates other components of the valve and/or valve actuator 102. In at least one embodiment, the calibration fixture 104 can be a partial valve actuator 102. In at least one embodiment, the calibration fixture 104 can be a complete valve actuator 102 used for the purpose of adjusting, or calibrating, multiple switch assemblies 110 for use with other valve actuators 102. Once adjusted, or calibrated, a switch assembly 110 can be mounted to a valve actuator 102 upon which it will be used, or placed in storage for future assembly to a valve actuator 102, as needed. In this manner, switch assemblies 110 can be assembled and all the switches 114 can be adjusted at one time prior to installation into the valve actuator 102 with which they will be used. Additionally, switch assemblies 110 can be assembled, adjusted, inspected, and stocked as subassemblies to shorten the time from an order being received until fully assembled actuator assemblies 100 are ready to ship.

In at least one embodiment, a high fire switch, a low fire switch, and a proof of closure switch can be rigidly mounted to a bracket 112. One or more arms 118 can be pivotably mounted to the bracket 112. Adjusting trip points of the high fire switch, the low fire switch, and the proof of closure switch can comprise adjusting a relationship between the arms 118 and the high fire switch, the low fire switch, and/or the proof of closure switch, while the switch assembly 110 is secured to the calibration fixture 104. For example, one or more set screws 126 can be used to adjust an angle between the arms 118 and one or more triggers 124 that trip the switches 114 according to movement of an actuator 102, an indicator 120 or simulator 120a. In at least one embodiment, a single arm 118 and trigger 124 pair can control the trip points of a high fire switch and a low fire switch using two set screws 126. In at least one embodiment, an arm 118 and trigger 124 pair can control the trip points of each of the rigidly mounted switches 114b. In at least one embodiment, adjustment of the trip point of one switch 114 does not impact the trip point of any other switch 114. In at least one embodiment, adjustment of the trip point of one switch 114 does impact the trip point of another switch 114, with such interaction being adjustable using different set screws. In at least one embodiment, the switch assembly 110 can include a plurality of fixedly mounted switches 114b, each of which can have different trip points, which can be independently adjustable.

In at least one embodiment, a limit switch can be pivotably mounted to the bracket 112. Adjusting the trip point of the limit switch can comprise adjusting an angle at which the limit switch is pivotably mounted to the bracket 112, while the switch assembly 110 is secured to the calibration fixture 104. For example, the limit switch can be rigidly mounted to a carrier 130 which in turn is rotatably mounted to the bracket 112. An angle between the bracket 112 and the carrier 130, and thus the limit switch, can be adjusted using a set screw 126.

In at least one embodiment, a calibration fixture 104 can be used for calibrating the switch assembly 110 to the valve actuator 102 independently of the valve actuator 102. In at least one embodiment, at least one of a rotatable switch 114a and the fixed switch 114b is wired to a terminal 140a mounted to the bracket 112. The calibration fixture 104 and/or the valve actuator 102 can include terminal 140b to which the terminals 140a mounted to the bracket 112 can be wired when the switch assembly 110 is mounted to the calibration fixture 104 or the valve actuator 102, respectively.

In at least one embodiment, according to certain aspects of the present disclosure, there can be a difference between securing the switch assembly 110 to the actuator 102 and/or the calibration fixture 104 and aligning the switch assembly 110 to the actuator 102 and/or the calibration fixture 104. One can appreciate, having read the present disclosure, that proper alignment of the switch assembly 110 impacts the adjustment, or calibration, thereof. Thus, in at least one embodiment, the switch assembly 110, the actuator 102, and/or the calibration fixture 104 can include datums 150a, b,c to ensure proper alignment of the switch assembly 110 to the actuator 102 and/or the calibration fixture 104. In at least one embodiment, the switch assembly 110 can include a switch datum 150a that physically mates with an actuator datum 150b, when the switch assembly 110 is properly aligned to the actuator 102. The switch datum 150a can also physically mate with a fixture datum 150c, when the switch assembly 110 is properly aligned to the calibration fixture 104. In at least one embodiment, the datums 150a,b,c support the switch assembly 110 upon the actuator 102 and/or the calibration fixture 104 such that aligning the switch assembly 110 with the actuator 102 and/or the calibration fixture 104 does not necessarily secure the switch assembly 110 to the actuator 102 and/or the calibration fixture 104. The switch assembly 110 can be separately secured to the actuator 102 and/or the calibration fixture 104 using fasteners, such as machine screws. In at least one embodiment, the switch assembly 110 can be separately secured to the calibration fixture 104 using a toggle clamp 152 mechanically linked to a bumper 154, which securely holds the switch assembly 110 down on the calibration fixture 104.

In at least one embodiment, a switch assembly 110 for a valve actuator 102 of a control valve can be created and/or configured as shown in the assembly method 1000 of FIG. 12. For example, as shown in step 1002, assembly can begin by mounting a plurality of switches 114 to a bracket 112. The switches 114 can include one or more switches fixedly and/or directly mounted to the bracket 112, as well as one or more switches rotatably and/or pivotably mounted to the bracket 112. As discussed above, the bracket 112 or portions thereof can be made of a non-conductive material in order to electrically isolate the switches 114 from each other and/or the valve actuator 102.

As shown in step 1004, the switch assembly 110 can then be aligned with a calibration fixture 104. Aligning the switch assembly 110 with the calibration fixture 104 can include positioning, aligning, or colimiting one or more assembly datums 150a on the switch assembly 110 to one or more corresponding fixture datums 150b on the calibration fixture 104. The assembly datum(s) 150a and the fixture datum(s) 150b can cooperate to ensure proper alignment between the switch assembly 110 and the calibration fixture 104. With the switch assembly 110 properly aligned to the calibration fixture 104, the switch assembly 110 can then be secured to the calibration fixture 104, as shown in step 1006. As discussed above, the calibration fixture 104 can simulate select functions, operations, and/or movements of the valve actuator 102.

As shown in step 1008, each of the switches 114 can be adjusted while the switch assembly 110 is aligned with, and secured to, the calibration fixture 104. In at least one embodiment, with the switch assembly 110 properly aligned to the calibration fixture 104, trip points of the switches 114 can be adjusted. For example, adjusting a trip point of the at least one fixed switch 114b can be performed by adjusting a trigger 124 between the at least one fixed switch 114b and an arm 118 pivotably mounted to the bracket 118. Adjusting a trip point of the at least one rotatable switch 114a can be performed by adjusting an angle at which the at least one rotatable switch 114a is mounted to the bracket 112.

Once the switches 114 have been adjusted with the switch assembly 110 secured to the calibration fixture 104, the switch assembly 110 can be removed from the calibration fixture 104, as shown in step 1010. At this point, the switch assembly 110 can be put into storage for future mating to a valve actuator 102, or can be immediately mated to a valve actuator 102.

For example, as shown in step 1012, the switch assembly 102 can be aligned with the valve actuator 102 by positioning the assembly datum 150a on the switch assembly 110 to an actuator datum 150b on the valve actuator 102, in much the same manner as was done with the calibration fixture 104. Once properly aligned, the switch assembly 110 can be secured to the valve actuator 102, as shown in step 1014. With the switch assembly 110 secured to the valve actuator 102, each of the switches 114 can be expected to be properly calibrated to the valve actuator 102 wherein by virtue of the adjustments made while the switch assembly 110 was secured to the calibration fixture 104.

In at least one embodiment, a switch assembly for a valve actuator can include a bracket for supporting a plurality of switches, one or more switches rotatably coupled to the bracket at one or more adjustable angles, and one or more switches fixedly mounted to the bracket. In at least one embodiment, the bracket can be non-conductive to electrically isolate the switches from the valve actuator. The valve actuator can trip or trigger the rotatably mounted switch(es) at a trip point (or points) that is/are independently adjustable by calibrating the adjustable angle(s). A trigger mechanism can be used to trip/trigger the fixedly mounted switch(es) at a trip point (or points) that is/are adjustable by calibrating the trigger mechanism. In at least one embodiment, the trigger mechanism can include an arm rotatably coupled to the bracket. An indicating end of the arm can couple with the actuator or a portion of the valve controlled by the actuator, such as a valve stem of the valve or a valve stem position indicator of the valve. A bracket end of the arm can be rotatably coupled to the bracket. Movement of the arm can directly or indirectly trip the fixedly mounted switch(es). One or more switch triggers can be adjustably coupled to the arm and can trip the fixedly mounted switch(es).

In at least one embodiment, the switch assembly can include one or more terminals mounted to the bracket, wherein at least one of the rotatable switch and the fixed switch is wired to the terminal. In at least one embodiment, the switch assembly can include a plurality of fixedly mounted switches, which can have different and independently adjustable trip points. In at least one embodiment, the switch assembly can include a calibration fixture for calibrating the switch assembly to the valve actuator independently of the valve actuator. In at least one embodiment, a switch assembly for an actuator of a valve can be set by assembling a plurality of switches to a bracket, thereby creating the switch assembly, aligning the switch assembly with a calibration fixture and adjusting the switches while the switch assembly is secured to the calibration fixture. Thereafter, the switch assembly can be mounted to the valve actuator having been calibrated for the valve actuator independently of the valve actuator. The switches can include one or more switches fixedly and/or directly mounted to the bracket, as well as one or more switches rotatably and/or pivotably mounted to the bracket. The calibration fixture can simulate select functions, operations, and/or movements of the valve actuator.

Aligning the switch assembly with the calibration fixture can include positioning, aligning, or colimiting one or more assembly datums on the switch assembly to one or more corresponding fixture datums on the calibration fixture. The assembly datum(s) and the fixture datum(s) can cooperate to ensure proper alignment between the switch assembly and the calibration fixture. With the switch assembly properly aligned with the calibration fixture, the switch assembly can then be secured to the calibration fixture. With the switch assembly properly aligned with, and secured to, the calibration fixture, trip points of the switches can be adjusted. For example, adjusting a trip point of at least one fixed switch can be performed by adjusting a trigger between the at least one fixed switch and an arm pivotably mounted to the bracket. Adjusting a trip point of the at least one rotatable switch can be performed by adjusting an angle at which the at least one rotatable switch is mounted to the bracket.

Once the switches have been adjusted with the switch assembly secured to the calibration fixture, the switch assembly can be removed from the calibration fixture. At this point, the switch assembly can be put into storage for future mating to a valve actuator, or can be immediately mated to a valve actuator. In either case, the switch assembly can be aligned with the valve actuator by positioning the assembly datum on the switch assembly to an actuator datum on the valve actuator, in much the same manner as was done with the calibration fixture. Then, the switch assembly can be secured to the valve actuator. Once the switch assembly is aligned with, and secured to, the valve actuator, each of the switches can be expected to be properly calibrated to the valve actuator by virtue of the adjustments made while the switch assembly was aligned with, and secured to, the calibration fixture.

The systems and methods disclosed herein are not limited to the exemplary valve and/or actuator types shown in the Figures for illustrative purposes and can be applicable or applied to many different types and styles of control valves, actuators, and associated systems. Further, while the teachings of the disclosure can be particularly advantageous for solenoid valves, they are not necessarily limited thereto and a control valve can be or include any type of valve, whether now known or later developed, such as, for example, linear, rotary, solenoid, pilot, diaphragm, mechanical, electromechanical, hydraulic, pneumatic and other types of valves for manipulating the passage of one or more fluids across a distance or point, separately or in combination, in whole or in part. The term "fluid(s)" as used herein includes any substance or material capable of flowing, such as, for example, liquid(s), gas(es) and combinations thereof (regardless of whether one or more solids or other non-fluids can be present therein).

Other and further embodiments utilizing one or more aspects of the systems and methods described above can be devised without departing from the spirit of Applicants' disclosures. For example, the systems and methods disclosed herein can be used alone or to form one or more parts of other valves, valve components and/or fluid control systems. Further, the various methods and embodiments of the valves and modules can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions.

The embodiments have been described in the context of preferred and other embodiments and not every embodiment of Applicants' disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicants' disclosures, but rather, in conformity with the patent laws, Applicants intend to fully protect all such modifications and improvements that come within the scope or range of equivalents of the claims.

What is claimed is:

1. A method of setting a switch assembly for a valve actuator configured to control a valve, the method comprising:
- assembling a plurality of switches to a bracket, thereby creating the switch assembly, by fixedly mounting at least one fixed switch to the bracket and by rotatably mounting at least one rotatable switch to the bracket;
- providing a calibration fixture that simulates the valve actuator;
- aligning the switch assembly with the calibration fixture by positioning an assembly datum on the switch assembly to a fixture datum on the calibration fixture, wherein the assembly datum and the fixture datum cooperate to ensure alignment between the switch assembly and the calibration fixture;
- securing the switch assembly to the calibration fixture;
- adjusting a first trip point of the at least one fixed switch, while the switch assembly is secured to the calibration fixture, by adjusting a trigger between the at least one fixed switch and an arm pivotably mounted to the bracket;
- adjusting a second trip point of the at least one rotatable switch, while the switch assembly is secured to the calibration fixture, by adjusting an angle at which the at least one rotatable switch is mounted to the bracket;
- removing the switch assembly from the calibration fixture;
- aligning the switch assembly with the valve actuator by positioning an assembly datum on the switch assembly to an actuator datum on the valve actuator, wherein the assembly datum and the actuator datum cooperate to ensure alignment between the switch assembly and the valve actuator; and
- securing the switch assembly to the valve actuator, wherein by virtue of the adjusting steps each of the plurality of switches is calibrated to the valve actuator.

2. The method of claim 1, wherein the at least one fixed switch includes a high fire switch to indicate a fully open position of the valve, a low fire switch to indicate a mid-stroke position of the valve, and a proof of closure switch to indicate a fully closed position of the valve, and wherein the at least one rotatable switch includes a limit switch to control a stroke limit of the valve actuator.

3. The method of claim 1, wherein the arm is configured to follow an indicator that moves with a valve stem of the valve as the valve actuator opens and closes the valve.

4. The method of claim 3, wherein the calibration fixture includes a simulator that simulates the indicator.

5. The method of claim 1, wherein assembling the plurality of switches to the bracket includes wiring at least one of the plurality of switches to a set of terminals mounted on the bracket.

6. A method of setting a switch assembly for a valve actuator, the method comprising:
- assembling a plurality of switches to a non-conductive bracket, thereby creating the switch assembly;
- providing a calibration fixture that mimics the valve actuator;
- aligning the switch assembly with the calibration fixture by positioning an assembly datum on the switch assembly to a fixture datum on the calibration fixture, wherein the assembly datum and the fixture datum cooperate to ensure alignment between the switch assembly and the calibration fixture;
- securing the switch assembly to the calibration fixture;
- adjusting trip points of the plurality of switches, while the switch assembly is secured to the calibration fixture;
- removing the switch assembly from the calibration fixture;
- placing the switch assembly into storage;
- removing the switch assembly from storage;
- aligning the switch assembly with the valve actuator by positioning an assembly datum on the switch assembly to an actuator datum on the valve actuator, wherein the assembly datum and the actuator datum cooperate to ensure alignment between the switch assembly and the valve actuator; and
- securing the switch assembly to the valve actuator, wherein by virtue of the adjusting the trip points of the plurality of switches while the switch assembly is secured to the calibration fixture each of the plurality of switches is calibrated to the valve actuator.

7. The method of claim 6, wherein the plurality of switches includes a high fire switch to indicate a fully open position of a valve controlled by the actuator, a low fire switch to indicate a mid-stroke position of the valve, a proof of closure switch to indicate a fully closed position of the valve, and a limit switch to control a stroke limit of the valve actuator.

8. The method of claim 7, wherein the high fire switch, the low fire switch, and the proof of closure switch are actuated by at least one arm mounted to the non-conductive bracket, wherein the at least one arm is configured to follow an indicator that moves with a valve stem of the valve as the valve actuator opens and closes the valve.

9. The method of claim 8, wherein the calibration fixture includes a simulator that simulates the indicator.

10. The method of claim 8, wherein the high fire switch, the low fire switch, and the proof of closure switch are rigidly mounted to the non-conductive bracket, wherein the at least one arm is pivotably mounted to the non-conductive bracket, and wherein adjusting the trip points of the high fire switch, the low fire switch, and the proof of closure switch comprises adjusting a relationship between the at least one arm and the high fire switch, the low fire switch, and the proof of closure switch, while the switch assembly is secured to the calibration fixture.

11. The method of claim 8, wherein the high fire switch, the low fire switch, and the proof of closure switch are rigidly mounted to the non-conductive bracket, wherein the at least one arm includes a first arm and a second arm, wherein the first and second arms are pivotably mounted to the non-conductive bracket, wherein adjusting the trip point of the high fire switch comprises adjusting a high fire trigger between the first arm and the high fire switch, wherein adjusting the trip point of the low fire switch comprises adjusting a low fire trigger between the first arm and the low fire switch, and wherein adjusting the trip point of the proof of closure switch comprises adjusting a closure trigger between the second arm and the proof of closure switch, while the switch assembly is secured to the calibration fixture.

12. The method of claim 11, wherein the high fire trigger, the low fire trigger, and the closure trigger are independently adjustable, such the adjusting one of the high fire trigger, the low fire trigger, and the closure trigger does not impact the adjustment of another of the high fire trigger, the low fire trigger, and the closure trigger.

13. The method of claim 11, wherein a high fire trip point and a low fire trip point are dependently adjustable, such the adjusting one of the high fire trip point and the low fire trip point impacts the adjustment of the other of the high fire trip point and the low fire trip point.

14. The method of claim 7, wherein the limit switch is pivotably mounted to the non-conductive bracket and wherein adjusting the trip point of the limit switch comprises adjusting an angle at which the limit switch is pivotably mounted to the non-conductive bracket, while the switch assembly is secured to the calibration fixture.

15. The method of claim 6, wherein assembling the plurality of switches to the non-conductive bracket includes wiring at least one of the plurality of switches to a set of terminals mounted on the non-conductive bracket.

\* \* \* \* \*